(12) United States Patent
Prokopenko

(10) Patent No.: US 7,985,301 B2
(45) Date of Patent: Jul. 26, 2011

(54) AUTOMATED ULTRASONIC CLEANING APPARATUS WITH TRIGGER MEANS FOR DRAINING FLUID THEREFROM

(76) Inventor: Aleksandr Prokopenko, Bordentown, NJ (US)

( * ) Notice: Subject to any disclaimer, the term of this patent is extended or adjusted under 35 U.S.C. 154(b) by 984 days.

(21) Appl. No.: 11/901,126

(22) Filed: Sep. 14, 2007

(65) Prior Publication Data

US 2009/0071515 A1    Mar. 19, 2009

(51) Int. Cl.
*B08B 3/12* (2006.01)
(52) U.S. Cl. .................... 134/56 R; 134/104.2; 134/105; 134/201; 134/902
(58) Field of Classification Search ............... 134/56 R, 134/104.2, 105, 113, 201, 902
See application file for complete search history.

(56) References Cited

U.S. PATENT DOCUMENTS

| | | | | |
|---|---|---|---|---|
| 3,229,702 A | * | 1/1966 | Murdoch, Jr. ................... | 134/89 |
| 3,640,295 A | | 2/1972 | Peterson | |
| 4,870,982 A | * | 10/1989 | Liu ............................... | 134/135 |
| 5,143,102 A | * | 9/1992 | Blaul ........................ | 134/58 R |
| 5,159,945 A | * | 11/1992 | Bannon ........................... | 134/85 |
| 5,228,144 A | * | 7/1993 | Kightlinger ...................... | 4/324 |
| 5,378,287 A | * | 1/1995 | Pedziwiatr ........................ | 134/1 |
| 5,931,174 A | * | 8/1999 | Salas et al. ...................... | 134/89 |
| 6,102,056 A | | 8/2000 | Kotsopey | |
| 6,568,409 B1 | * | 5/2003 | Fleck ............................. | 134/110 |
| 2004/0178061 A1 | * | 9/2004 | Accattato ...................... | 204/241 |
| 2005/0103360 A1 | * | 5/2005 | Tafoya ............................ | 134/18 |
| 2006/0113873 A1 | * | 6/2006 | Manchester et al. .......... | 310/328 |

OTHER PUBLICATIONS

Omelan Kotsopey, DMD, "Hands Off", Dental Economics, Sep. 1999.
ESMA, "The Automatic Ultrasonic Series" Advertising Brochure (models E397, E498 and E789).

* cited by examiner

*Primary Examiner* — Joseph L. Perrin
*Assistant Examiner* — Benjamin Osterhout
(74) *Attorney, Agent, or Firm* — Kelly Merkel, Esq.

(57) ABSTRACT

The present invention discloses an ultrasonic cleaner in which an automated ultrasonic cleaning operation is executed using an aqueous solution. The cleaner includes a tank having a valve means in fluid communication therewith, a bottom tank portion with at least one drainage aperture therethrough and at least one tank wall depending therefrom to provide a solution retention region. At least one ultrasonic transducer is removably secured to one of the tank bottom and tank wall. A partition in the solution retention region has at least one aperture defined therethrough and defines a service section and a support section thereby. A trigger means operatively disposed in the support section comprises a drainage flapper in operable communication with a signal means between a first rest position, in which the flapper impedes flow of the solution through the drainage aperture, and a second elevated position, in which the flapper is elevated relative to the drainage aperture to facilitate unimpeded fluid flow therethrough.

18 Claims, 2 Drawing Sheets

AUTOMATED ULTRASONIC CLEANING APPARATUS WITH TRIGGER MEANS FOR DRAINING FLUID THEREFROM

FIELD OF THE INVENTION

The present invention is directed to an improved ultrasonic cleaning apparatus for optimal sanitation of medical and dental instruments. The ultrasonic cleaning apparatus of the present invention employs a single tank having dual compartments to facilitate automatic completion of cleaning, rinsing and drying steps in an ultrasonic cleaning operation. A first compartment retains items to be cleaned therewithin apart from a second compartment that houses trigger means for drainage of fluid from the tank. In this configuration, the ultrasonic cleaner of the present invention eliminates costly automated elements without compromising beneficial sanitation of the instruments to be cleaned.

BACKGROUND AND SUMMARY OF THE INVENTION

Manufacturers and surface treaters from a variety of industries and professions have long recognized ultrasonic cleaning as an effective means of removing contaminants from a wide variety of substrates. The process has been embraced for multiple industrial, medical, commercial and residential applications as providing excellent penetration of diminutive interstices on intricate devices. In fact, the use of ultrasonic cleaners has become increasingly popular due to government restrictions on the use of chlorofluorocarbons (i.e., 1,1,1-trichloroethane), encouraging many manufacturers to replace conventional solvent-based cleaning methods with equally effective immersion cleaning technologies.

The effectiveness of ultrasonic cleaning relies upon energy released from the creation and collapse of microscopic cavitation bubbles that break up and release contaminants from the surface to be cleaned. A conventional ultrasonic cleaning system includes a radiating diaphragm having at least one ultrasonic transducer (typically piezoelectric or magnetostrictive) mounted thereto, an electrical generator and a tank filled with an aqueous solution. The generator converts a standard electrical frequency of 60 Hz into high ultrasonic frequencies (generally from about 20 kHz to about 80 kHz), causing the transducer to vibrate. Consequent vibration of the diaphragm induces alternating positive and negative pressure waves in the solution to produce micron-size bubbles (this process is known as cavitation). Upon contact with an item to be cleaned, the bubbles implode, releasing jets thereby that travel at speeds of up to 400 km/hr toward the item surface. With the combination of pressure, temperature, and velocity, the jets dislodge contaminants from their bonds with the item surface very effectively (see Jeff Hancock, "Ultrasonic Cleaning", www.bluewaveinc.com (citing ASM Handbook, Volume 5: Surface Engineering)).

The efficiency of ultrasonic cleaning devices has inured specifically to the benefit of medical, surgical, dental and laboratory applications (collectively "medical" applications). Environmental regulations and health agency guidelines (promulgated by government agencies such as the Occupational Health and Safety Administration and the Centers for Disease Control in the United States and commensurate international agencies) dictate that medical instruments must be maintained with sufficient hygienic standards so as to pre-empt transmission of infection. Due to the danger of hand scrubbing medical instruments, medical offices typically have at least one ultrasonic cleaner in which cleaning, rinsing and drying operations are executed onsite (in some cleaners the option of pre-soaking is also available). An example of such a device is disclosed by U.S. Pat. No. 3,640,295 to Peterson ("Peterson"), which discloses an ultrasonic cleaner in which instruments to be cleaned are moved with respect to a plurality of ultrasonic transducers. The disclosed cleaner includes a tank that houses a circulating fluid means therein and supports multiple transducers thereon. The tank supports a cradle that oscillates with respect to an oscillating frame, wherein the frame moves in a semicircular path within an aqueous solution retained by the tank. A case carrying at least one medical instrument is provided with hingedly attached top and bottom portions and walls having perforations therethrough to accommodate ultrasonic waves. The case is removably mounted in a fixed position with respect to the frame and oscillatable therewith so as to minimize the effects of null points of the ultrasonic waves in the solution.

An alternative to the Peterson device is provided in commercially available table-top ultrasonic cleaners, such as those produced by ESMA. In one model, an ultrasonic cleaner utilizes three tanks in a single housing to effect a complete cleaning, rinsing and drying operation. In this commercial configuration, one tank retains an ultrasonic cleaning solution, an adjacent tank retains an ultrasonic rinsing agent and a third tank applies warm air to effect sufficient drying of rinsed instruments placed therein. The cleaning operation is therefore executed without expensive automated systems, making the device desirable to operate within available space constraints. The need to transfer medical instruments among the tanks (either manually or automatically), however, substantially elevates the risk of cross-contamination due to re-use of solutions or inattention to identification of instruments. Such transfer is eliminated in certain automated ultrasonic cleaners such as those produced by ESMA in the company's E291 and E789 models. Even in these improved models, a hot air drying means is disposed in a tank cover, thereby creating a heavy device that consumes valuable space in a laboratory or medical environment and inhibits use due to the enhanced effort required to lift the tank cover for proper cleaner operation.

In an effort to eliminate the need to manually or automatically transfer parts during an ultrasonic cleaning operation, U.S. Pat. No. 6,102,056 to Kotsopey ("Kotsopey", the disclosure of which is incorporated by reference herein) discloses an ultrasonic cleaner having a tank with an open top for inserting articles therein. The tank has each of a liquid inlet opening, a liquid outlet opening, an air inlet window and an air outlet duct. A first overflow passage is disposed adjacent the air inlet opening to prevent flow of liquid therethrough. Similarly, a second overflow passage adjacent the air outlet duct prevents liquid from flowing therethrough. In this configuration, a complete cleaning operation (i.e., cleaning, rinsing and drying steps) is performed in a single continuous operation in a manner such that the solution in the tank never interferes with the flow of air therethrough. Although the cleaner disclosed by Kotsopey effectively integrates cleaning, rinsing and drying functions in an automated operation, the cleaner integrates additional structure such as overflow weirs and perforated air distribution channels that provide a heavy, cumbersome structure that is expensive to manufacture and maintain.

Although the aforementioned cleaners sufficiently sanitize medical instruments from immersion processes executed therein, such devices are cumbersome for laboratory and medical applications. The tank constructions of such devices require extra structure that contributes to tank weight and maintenance. For instance, a separate compartment that is required for drying the instruments contributes to manufacturing and maintenance costs and deleteriously exposes electrical components to excess solution. In medical and laboratory environments, such conditions are detrimental to consideration of space constraints and further inhibit proper use of such cleaning devices, thereby contributing to cross contamination risks.

It is therefore desirable to provide an ultrasonic cleaning device that eliminates the disadvantages of conventional immersion cleaners and advantageously consumes minimal space in the user's environment. The entire ultrasonic cleaning operation (i.e., cleaning, rinsing and drying and an optional pre-soaking mode) desirably occurs in a single tank in which the items to be cleaned remain stationary. Instead, the required solutions are poured into and drained from the tank using a trigger function that eliminates complicated tank structure. Hot air is subsequently circulated in the same tank to effect the drying function. Such a configuration not only saves space, but also reduces fiscal and temporal expenditures and cross-contamination risks while advocating an automated process without the need for expensive robotics.

SUMMARY OF THE INVENTION

It is an advantage of the present invention to provide an improved ultrasonic cleaner for surgical, medical, dental and laboratory instruments.

It is another advantage of the present invention to provide an improved ultrasonic cleaner that is easily manufactured, maintained and operated within the space constraints of a medical and/or laboratory facility.

It is a further advantage of the present invention to provide an improved ultrasonic cleaner that employs a trigger mechanism to selectively drain fluid from a retention tank and thereby execute cleaning, rinsing, drying and optioning pre-soaking processes in a single tank.

In accordance with these and other advantages, the present invention provides an apparatus for automated execution of an ultrasonic cleaning operation in an aqueous solution. The present invention ultrasonic cleaner includes a tank with a valve means in fluid communication therewith for supply of water thereto during the cleaning operation. A bottom tank portion is provided with an external surface and an internal surface defining a predetermined thickness therebetween. At least one drainage aperture is provided in the bottom portion that facilitates egress of the solution from the tank after cleaning and rinsing modes of the ultrasonic cleaning operation. At least one wall depends from the bottom tank portion so that a retention region for said solution is defined thereby. At least one ultrasonic transducer is removably secured to at least one of the bottom tank portion and the tank wall to induce cavitation in the solution. A partition having at least one aperture defined therethrough is provided in the retention region to define at least one service section and at least one support section thereby.

A trigger means is operatively disposed in the support section to effect unimpeded flow of the solution through the drainage aperture during the ultrasonic cleaning operation. The trigger means comprises a drainage flapper in operable communication with a signal means (such as a solenoid) between a first rest position, in which the flapper impedes flow of the solution through the drainage aperture, and a second elevated position, in which the flapper is elevated relative to the drainage aperture to facilitate unimpeded fluid flow therethrough. The trigger means further comprises a connecting means in operable communication with the drainage flapper and the signal means, which connecting means may be an articulatable arm that is responsive to the signal means to move the drainage flapper between its first rest and second elevated positions during the ultrasonic cleaning operation. The signal means is in electrical communication with a liquid level sensor disposed in either of the service section or the support section, which sensor detects the level of the solution in the tank and indicates such level to the signal means to operate the drainage flapper accordingly. A programmable controller may also be provided for programmable timing and sequence of drainage flapper operation.

A portion of the tank wall that is provided in the support section of the tank includes a fluid intake aperture that establishes fluid communication between the valve means and the tank and an overflow aperture that accommodates inadvertent overflow of the solution from the tank during the ultrasonic cleaning operation. A conveyance conduit is selectively disposed in communication with the overflow aperture to accommodate egress of overflow from the tank to a sewer disposal or receptacle.

The ultrasonic cleaner of the present invention further includes a basket removably disposed in the service section that accommodates placement of least one instrument therein. The support section desirably houses at least one heating means in combination with an air circulation means such as an oscillating fan. Visual separation between the items to be cleaned and the operable elements of the cleaner encourages the user to refrain from interference with such elements during the ultrasonic cleaning operation. In addition, perforations in the partition accommodate side-by-side accommodation of the instruments and the operable elements to facilitate cleaning, rinsing and drying of elements in a single housing, thereby easing use of the cleaner while minimizing its size without detriment to performance.

Various other advantages and features of the present invention will become readily apparent from the following detailed description, and the inventive features will be particularly evident from the appended claims.

DETAILED DESCRIPTION OF THE INVENTION

Figure 1:
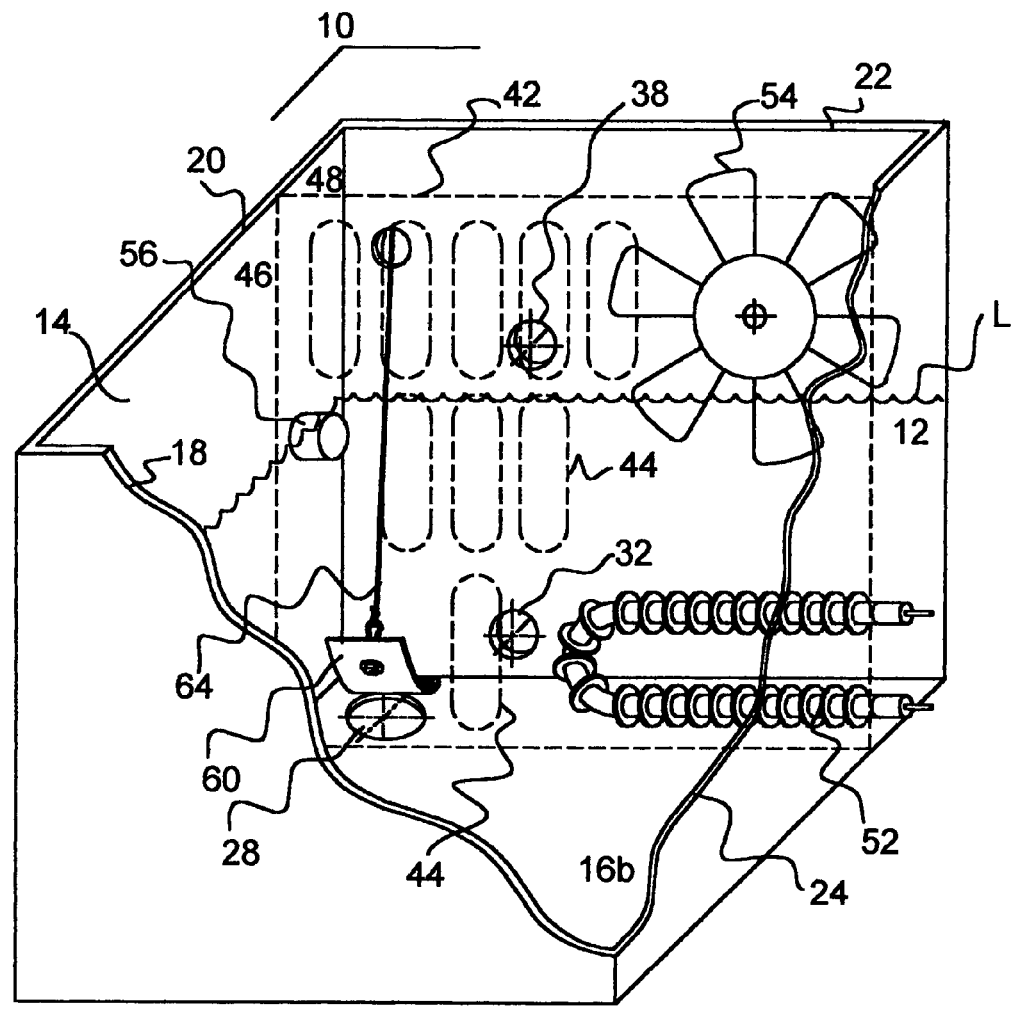
FIG. 1 shows a schematic partial sectional view of an automated ultrasonic cleaning tank of the present invention.
Figure 2:
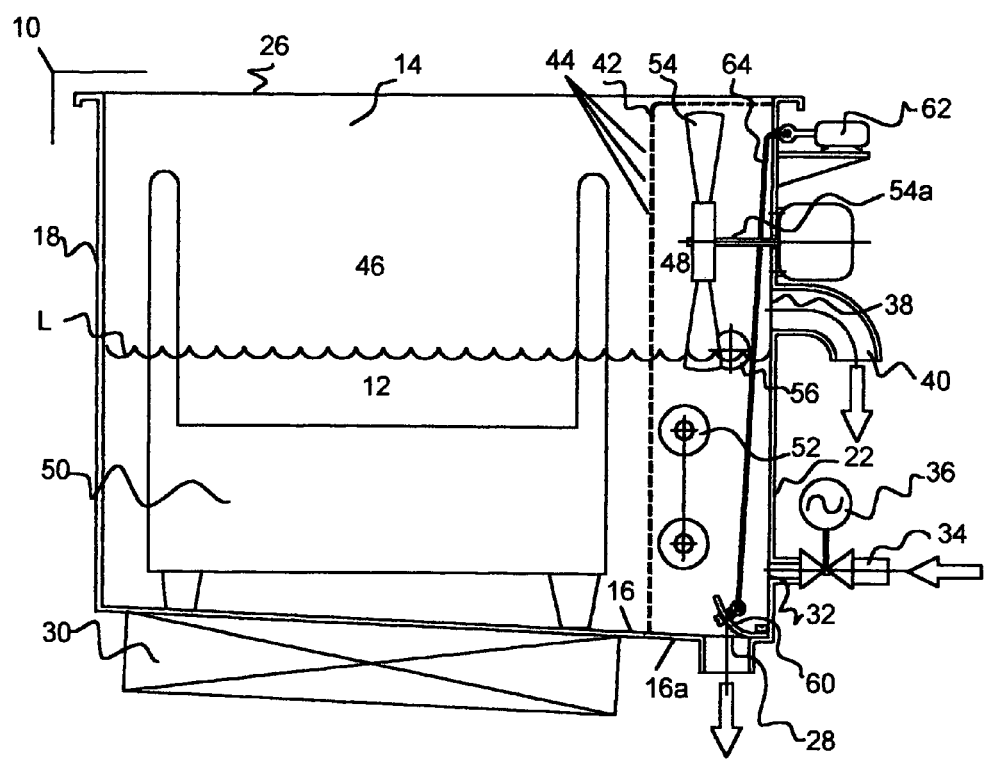
FIG. 2 shows a schematic side view of the automated ultrasonic cleaning tank of FIG. 1.

Now referring to the figures, wherein like numbers identify like elements, an automated ultrasonic cleaning apparatus 10 of the present invention is provided in FIGS. 1 and 2. Cleaning apparatus 10 executes a complete ultrasonic cleaning operation, which herein comprises a cleaning mode, a rinsing mode and a drying mode (as further described hereinbelow). In typical aqueous ultrasonic cleaning systems, contaminants are removed during the cleaning mode. The rinse stage removes any effluents and residual detergent, and a dryer removes any remaining rinse water. An optional pre-soaking mode may also be performed prior to the cleaning mode to inhibit adhesion of bodily fluids and effluents to the instruments to be cleaned.

Fluid 12 that is employed in the pre-soaking, cleaning and rinsing modes alternately comprises pure water that is delivered to apparatus 10 by a fluid conduit (as described further hereinbelow) and a solution that is employed in the cleaning mode. The solution is desirably a water-based, non-toxic detergent that is also nonflammable and environmentally friendly. Aqueous cleaners of this type reduce the surface tension of the water and also accommodate chemical reactions with the debris to be removed. The chemicals in an aqueous cleaner may comprise one or more of soaps, surfactants, acids, chelating agents, builders, saponofiers, alkaline and combinations thereof. The precise solution, however, should be selected to complement the material composition of the items to be cleaned and the debris to be removed as is known in the art. For items fabricated from iron, steel and stainless steel, moderately alkaline and chlorinated-solutions may be appropriate.

Cleaning apparatus 10 employs a tank 14 that comprises a generally rectangular reservoir with a bottom portion 16 having an external surface 16a and an opposed internal surface 16b defining a predetermined thickness therebetween. Successive wall surfaces 18, 20, 22 and 24 depend generally upwardly to define a tank ingress 26 thereby. Tank ingress 26 is typically covered by a lid (not shown) removably placed thereon as is known in the art. Although tank 14 is shown as a rectangular reservoir, it is understood that the tank may assume any geometry that is amenable to successful practice of the present invention.

Bottom tank portion 16 includes at least one aperture 28 that accommodates unimpeded drainage of fluid 12 therethrough. Drainage aperture 28 may be provided in combination with a predetermined incline defined along internal surface 16b of bottom tank portion 16 to optimize drainage of fluid from tank 14 after completion of the cleaning and/or rinsing modes. At least one ultrasonic transducer 30 is removably secured to an external surface of one of external surface 16a of bottom tank portion 16 and/or at least one of tank walls 18, 20, 22 and 24. Transducer 30 may be welded directly to the tank or alternatively placed in watertight units that are immersed in fluid 12 in tank as is known in the art. Transducer 30 is selected from a plurality of commercially available transducers, including but not limited to piezoelectric material (e.g. lead zirconate-titanate or barium titanate) and magnetostrictive material (e.g. nickel or ferrite).

Tank wall 22 includes a fluid intake aperture 32 defined therethrough that establishes fluid communication between a fluid source (not shown) and tank 14 (see FIG. 2). A fluid conduit 34 directs flow from the fluid source to tank 14 in response to operation of valve 36 in operable communication therewith. Valve 36 desirably comprises a readily available solenoid valve that can control delivery of fluid to tank 14 as is known in the art.

Tank wall 22 also includes an overflow aperture 38 defined therethrough that accommodates inadvertent overflow of fluid 12 from tank 14 during a cleaning operation. Overflow aperture 38 may have a fluid conduit in fluid communication therewith (such as conveyance conduit 40 shown in FIG. 2) that accommodates such overflow to a receptacle or fluid outlet. Fluid that enters tank 14 and rises above a maximum fluid level L exits tank 14 via overflow aperture 38 for delivery to a sewer line or reservoir by conveyance conduit 40. It is understood that accommodation of overflow may also be effected by an overflow weir (not shown) as taught by Kotsopey (described hereinabove and incorporated by reference herein).

Tank 14 houses a partition 42 therein that has at least one aperture 44 defined therethrough. Partition 42 is disposed generally parallel to tank walls 18 and 22 so as to define a service section 46 and a support section 48 thereby, the relative sizes of which may be selected at the time of performing a cleaning operation. Support section 48 is desirably delineated by partition 42 and tank 14 such that drainage aperture 28, fluid intake aperture 32 and overflow aperture 38 remain separated from service section 46. Although not shown herein, optional means for changing the relative areas of service section 46 and support section 48 may be provided along at least one of internal surface 16b of bottom tank portion 16 and at least one of tank walls 20 and 24. Such means may include corresponding recesses and protrusions defined on at least one of the tank bottom, a tank wall and the partition to accommodate slidable movement of partition 42 relative to tank walls 18 and 22. It is understood that equivalent structures may be employed without departing from the scope of the present invention.

Service section 46 is sufficiently sized to accommodate placement of a basket 50 or like receptacle therein. Basket 50 receives at least one instrument, substrate or other item (collectively "instruments") to be cleaned and retains such instruments in a stationary position throughout the ultrasonic cleaning operation. Basket 50 is selected from a plurality of commercially available baskets having mesh sizes and material compositions as are known in the art to accommodate the instruments' configurations and applications. Although basket 50 is shown as a desirable housing for items to be cleaned, it is understood that a variety of media may be used alternatively that successfully accommodate ultrasonic activity.

Referring further to FIG. 2, support section 48 is being sufficiently sized to accommodate several operative elements of cleaning apparatus 10 therein. In particular, support section 48 houses a heater such as finned heater 52 that heats fluid 12, as well as air, in tank 14 during a cleaning operation. Heater 52 is desirably positioned so as to remain immersed in fluid 12 during the pre-soaking and cleaning modes. Although heater 52 is shown housed inside tank 14, it is understood that one or more equivalent heaters may be mounted along an external surface of at least one of tank walls 18, 20, 22 and 24.

Heater 52 is housed in combination with an oscillating fan 54 that circulates air in tank 14 during the drying mode of an ultrasonic cleaning operation. Rotational movement of fan 54 is effected by an axle 54a that is desirably positioned above a maximum level L at which tank 14 retains fluid 12. Such liquid level is detected by a sensor 56 (shown disposed in support section 46 but alternatively disposed in service section 46) that monitors the fluid level in tank 14 throughout the cleaning operation. The integration of the drying mode directly within tank 14 is an important feature of the present invention that overcomes detrimental transfer of instruments (thereby inuring to the hygienic benefit of instruments cleaned by the present invention) and obviates inefficient and costly structures inherent in conventional ultrasonic cleaning devices.

A trigger means is operatively disposed in support section 48 for effecting unimpeded flow of fluid 12 through drainage aperture 28 during an ultrasonic cleaning operation. The trigger means includes a drainage flapper 60 in operable communication with a signal means such as solenoid 62 shown in FIG. 2. Flapper 60 has a first rest position, in which the flapper obstructs drainage aperture 28 to prevent flow of fluid 12 therethrough, and a second elevated position, in which the flapper reveals at least a portion of drainage aperture 28 for unimpeded fluid flow therethrough. Solenoid 62, upon receipt of a signal from liquid level sensor 56 (indicating that fluid 12 has reached a predetermined level in tank 14), induces movement of a connecting means such as articulatable arm 64 that is operably connected to flapper 60 so as to move the flapper between its first and second positions (although it is understood that any equivalent connecting means, such as a cable, linkage or equivalent, may be employed that is amenable to operation of the present invention). Movement of articulatable arm 64 raises flapper 60 to effectively and simply drain fluid 12 from tank 14 at desired intervals during an ultrasonic cleaning operation. In this manner, not only does the present invention provides a visual index to the user that deters user interference with the device's operational elements, but it also attenuates the complexity and cost of successfully executing a repeatable and predictable ultrasonic cleaning process.

Programming and execution of an ultrasonic cleaning process is desirably effected by a programmable controller as is well known in the art. In operation, a user programs the duration of the cleaning, rinsing and drying modes and selects whether a pre-soaking mode will initiate the cleaning operation. The user may also program automatic addition of detergents during the cleaning mode if automatic dispensers are selectively included with the present invention.

During operation of cleaning apparatus 10, a user places at least one instrument in basket 50 and subsequently lowers the basket in service section 48 for stationary retention therein. If the user elects to perform a pre-soaking mode, the controller sends a signal to valve 34 that initiates delivery of water from a fluid source through conduit 34 for terminal delivery through fluid intake aperture 32 to tank 14. Water fills tank 14 to a pre-determined level L as detected by sensor 56 (level L is variably dependent upon the quantity and types of instruments to be cleaned). If, due to placement of basket 50 in service section 48, or otherwise due to delivery of excess water to tank 14, the volume of delivered water exceeds the desired level L, such excess water will exit tank 14 via overflow aperture 38 to prevent inadvertent spillover from tank ingress 26. Pre-soaking modes desirably deter adhesion of biological fluids to instruments as a critical means of preventing the spread of infection.

When water reaches the pre-determined level L, one or more cleaning concentrates are added to tank 14 (either manually or automatically) to obtain a solution thereby. Heater 52 warms the solution to a predetermined temperature at which the properties of the solution provide additional cleaning benefits as is known in the art. In ultrasonic cleaning applications, the surface tension and the vapor pressure characteristics of the cleaning fluid affect cavitation intensity (and thus cleaning effectiveness). The energy required to form a cavitation bubble in a liquid is proportional to both surface tension and vapor pressure. When the vapor pressure of the liquid is low, as is the case with cold water, cavitation is difficult to produce but becomes less and less so as the temperature is increased. Disposition of heater 52 directly in tank 14 therefor enhances the ultrasonic cleaning process by providing immediate elevation of water temperature and therefore improved cleaning effectiveness.

Transducer 30 is activated thereafter to commence cavitation so as to clean the instruments in basket 50. Depending on the number and types of items to be cleaned, cavitation can be programmed according to a predetermined schedule. At the termination of the cleaning mode, a signal to solenoid 62 induces movement in articulatable arm 64 such that flapper 60 raises from its first rest position to its second elevated position to reveal drainage aperture 28 thereby. Fluid 12 escapes tank 14 for eventual delivery to an external sewer line or a reservoir in fluid communication therewith. After a predetermined temporal duration, or after sensor 56 detects descent of the fluid level below level L, a signal sent to solenoid 62 releases flapper 60 to its first rest position, thereby obstructing drainage aperture 28 in preparation for the rinsing mode.

In the rinse mode, valve 34 again delivers a predetermined water volume to tank 14 as detected by sensor 56. After a predetermined rinsing duration (which may be dictated by temporal duration or the attainment of a predetermined water volume in tank 14), solenoid 62 indices movement in articulatable arm 64 so as to move flapper 60 from its first rest position to its second elevated position. The rinse water, along with the effluents contained therein, flows unimpeded though drainage aperture 28 to a sewer line or biohazard receptacle in fluid communication therewith. After a predetermined temporal duration, or alternatively, after sensor 56 detects release of the rinse water from tank 14, a corresponding signal is sent to solenoid 62. Articulatable arm 64 correspondingly returns flapper 60 to its first position so as to cover drainage aperture 28 thereby.

In the final drying mode, fan 54 circulates air in tank 14 that is heated by heater 52. Partition apertures 44 allow free circulation of the heated air in both service section 46 and support section 48 while providing the user with a visual indication that fan 54 an heater are in use (and should therefore not be touched).

The ultrasonic cleaning apparatus of the present invention provides a simple and cost-effective device for optimal cleaning of intricately formed devices, especially in medical and laboratory applications where allocation of space is critical. Instead of allocating space for a drying means relative to a tank cover or outside of the tank itself, the present invention combines wet and dry processes in a single functional housing. In addition, the trigger means of the present invention replaces expensive automated systems that require substantial fiscal and spatial resources. The present invention therefore provides a simply operated and maintained device that encourages user operation, inuring to the benefit of optimum instrument sanitation.

Various changes to the foregoing described and shown structures are now evident to those skilled in the art. The matter set forth in the foregoing description and accompanying drawings is therefore offered by way of illustration only and not as a limitation. Accordingly, the particularly disclosed scope of the invention is set forth in the following claims.

What is claimed is:

1. An apparatus for automated execution of an ultrasonic cleaning operation, comprising:
   a tank having a valve means in fluid communication therewith; said tank having a bottom tank portion with an external surface and an internal surface defining a predetermined thickness therebetween, said bottom tank portion having at least one drainage aperture that accommodates drainage of a cleaning fluid therethrough; said bottom tank portion having at least one wall depending therefrom wherein said bottom tank portion and said at one tank wall define a retention region for retaining said fluid thereby;
   at least one ultrasonic transducer removably secured to at least one of said bottom tank portion and said at least one tank wall;
   a partition having at least one aperture defined therethrough, said partition being disposed in said tank region so as to define at least one service section and at least one support section thereby;
   a heating means disposed in said support section so as to be at least partially immersed in said fluid during said ultrasonic cleaning operation; and
   a trigger means operatively disposed in said support section for effecting unimpeded flow of said fluid through said drainage aperture during said ultrasonic cleaning operation.

2. An automated ultrasonic cleaning apparatus according to claim 1, wherein said partition is disposed in parallel relation to said at least one tank wall.

3. An automated ultrasonic cleaning apparatus according to claim 2, wherein a fluid intake aperture defined in said at least one tank wall establishes fluid communication between said valve means and said tank.

4. An automated ultrasonic cleaning apparatus according to claim 3, wherein an overflow aperture defined in said at least one tank wall accommodates inadvertent overflow of said fluid from said tank during said ultrasonic cleaning operation.

5. An automated ultrasonic cleaning apparatus according to claim 4, wherein a conveyance conduit is disposed in communication with said overflow aperture to accommodate egress of said overflow from said tank.

6. An automated ultrasonic cleaning apparatus according to claim 4, wherein said drainage aperture, said fluid intake aperture and said overflow aperture are disposed in said service section.

7. An automated ultrasonic cleaning apparatus according to claim 1, wherein said transducer is selected from a piezoelectric material and a magnetostrictive material.

8. An automated ultrasonic cleaning apparatus according to claim 1, wherein said valve means comprises at least one solenoid valve.

9. An automated ultrasonic cleaning apparatus according to claim 1, further comprising a programmable controller in electrical communication therewith.

10. An automated ultrasonic cleaning apparatus according to claim 1, wherein at least one of said partition, said bottom tank portion and said at least one tank wall includes means for removably securing said partition in said tank.

11. An automated ultrasonic cleaning apparatus according to claim 1, further comprising a basket removably disposed in said service section, said basket accommodating placement of least one instrument therein.

12. An automated ultrasonic cleaning apparatus according to claim 1, further comprising an air circulation means disposed in said support section for circulating air heated by said heating means.

13. An automated ultrasonic cleaning apparatus according to claim 12, wherein said air circulation means comprises an oscillating fan.

14. An automated ultrasonic cleaning apparatus according to claim 1, wherein said trigger means comprises a drainage flapper in operable communication with a signal means between a first rest position, in which said flapper impedes flow of said fluid through said drainage aperture, and a second elevated position, in which said flapper is elevated relative to said drainage aperture to facilitate unimpeded fluid flow therethrough.

15. An automated ultrasonic cleaning apparatus according to claim 14, further comprising a liquid level sensor that detects a level of said fluid in said tank during said ultrasonic cleaning operation and indicates said fluid level to said signal means.

16. An automated ultrasonic cleaning apparatus according to claim 15, wherein said signal means comprises a solenoid in signal communication with said liquid level sensor.

17. An automated ultrasonic cleaning apparatus according to claim 14, wherein said trigger means further comprises a connecting means in operable communication with said drainage flapper and said signal means.

18. An automated ultrasonic cleaning apparatus according to claim 17, wherein said connecting means comprises an articulatable member operably connected to said drainage flapper so as to move said drainage flapper between said first rest position and said second elevated position in response to said signal means.

* * * * *